US012557954B2

(12) United States Patent
Li et al.

(10) Patent No.:     US 12,557,954 B2
(45) Date of Patent:          Feb. 24, 2026

(54) DEBRIS CLEANING MECHANISM AND CLEANING DEVICE

(71) Applicant: Beijing Roborock Technology Co., Ltd., Beijing (CN)

(72) Inventors: Xing Li, Beijing (CN); Zhimin Yang, Beijing (CN); Yungen Qin, Beijing (CN); Cheng Yang, Beijing (CN); Guangzhong Luo, Beijing (CN); Ping Luo, Beijing (CN); Liang Qiao, Beijing (CN)

(73) Assignee: Beijing Roborock Technology Co., Ltd., Beijing (CN)

( * ) Notice:     Subject to any disclaimer, the term of this patent is extended or adjusted under 35 U.S.C. 154(b) by 384 days.

(21) Appl. No.:     18/020,136

(22) PCT Filed:     Jun. 25, 2021

(86) PCT No.:     PCT/CN2021/102430
§ 371 (c)(1),
(2) Date:     Feb. 7, 2023

(87) PCT Pub. No.: WO2022/057361
PCT Pub. Date: Mar. 24, 2022

(65)     Prior Publication Data
US 2023/0292972 A1     Sep. 21, 2023

(30)     Foreign Application Priority Data

Sep. 18, 2020     (CN) .......................... 202010989850.4
Apr. 1, 2021     (CN) .......................... 202120670580.0

(51) Int. Cl.
*A47L 9/20*          (2006.01)
*B01D 46/681*          (2022.01)

(52) U.S. Cl.
CPC .............. *A47L 9/20* (2013.01); *B01D 46/681* (2022.01)

(58) Field of Classification Search
CPC ........ A47L 9/20; A47L 9/1675; B01D 46/681
(Continued)

(56)     References Cited

U.S. PATENT DOCUMENTS 10,390,670 B2 *     8/2019     Robinson .................. A47L 5/24
2001/0025395 A1 *     10/2001     Matsumoto ........... A47L 9/1683
55/447

(Continued)

FOREIGN PATENT DOCUMENTS

CN     207666537 U     7/2018
CN     207870839 U     9/2018
(Continued)

OTHER PUBLICATIONS

Extended European Search Report issued in the corresponding Application No. 21868190.6, dated Oct. 14, 2024.
(Continued)

*Primary Examiner* — Bryan R Muller
(74) *Attorney, Agent, or Firm* — Morgan, Lewis & Bockius LLP

(57)     ABSTRACT

A debris cleaning mechanism and a cleaning device, comprising a driving mechanism, a transmission mechanism, and a debris scraping mechanism. The transmission mechanism comprises a gear box, and the gear box is connected to the driving mechanism by means of an input shaft and connected to the debris scraping mechanism by means of an output shaft; the debris scraping mechanism comprises a debris scraping body, and the output shaft is in transmission connection with the debris scraping body to drive the debris scraping body to move; the debris scraping body is provided with a first and/or a second debris scraping strip. The (Continued)

cleaning device comprises a debris barrel, a debris barrel cover, the debris cleaning mechanism, and a cover opening mechanism; when a rack of the transmission mechanism moves to a preset position along the axial direction of the debris barrel, the cover opening mechanism is pushed to move.

8 Claims, 11 Drawing Sheets

(58) Field of Classification Search
USPC ..................................................... 55/295–297
See application file for complete search history.

(56) References Cited

U.S. PATENT DOCUMENTS

| | | | | |
|---|---|---|---|---|
| 2003/0159235 | A1* | 8/2003 | Oh ........................ | A47L 9/1666 |
| | | | | 15/352 |
| 2003/0221278 | A1 | 12/2003 | Oh | |
| 2007/0017064 | A1* | 1/2007 | Gogel ....................... | A47L 9/20 |
| | | | | 15/352 |
| 2009/0031525 | A1 | 2/2009 | Makarov et al. | |
| 2017/0209012 | A1* | 7/2017 | Peters ...................... | B04C 5/22 |
| 2017/0209013 | A1 | 7/2017 | Cho | |
| 2018/0368637 | A1 | 12/2018 | Gammack et al. | |
| 2019/0183301 | A1* | 6/2019 | Hwang ................. | A47L 9/2884 |
| 2019/0313876 | A1 | 10/2019 | Lindenbeck | |
| 2020/0138255 | A1* | 5/2020 | Sato ...................... | A47L 9/0063 |

FOREIGN PATENT DOCUMENTS

| | | |
|---|---|---|
| CN | 109512330 A | 3/2019 |
| CN | 209808212 U | 12/2019 |
| CN | 111184467 A | 5/2020 |
| CN | 111449568 A | 7/2020 |
| CN | 112043203 A | 12/2020 |
| CN | 112056988 A | 12/2020 |
| CN | 112056989 A | 12/2020 |
| CN | 212382569 U | 1/2021 |
| CN | 212521648 U | 2/2021 |
| EP | 1574160 A1 | 9/2005 |
| JP | 2003339596 A | 12/2003 |
| JP | 2004283345 A | 10/2004 |
| JP | 2009077805 A | 4/2009 |
| JP | 2010220965 A | 10/2010 |
| JP | 2011-092476 A | 5/2011 |

OTHER PUBLICATIONS

International Search Report issued in corresponding International Patent Application No. PCT/CN2021/102430 dated Sep. 15, 2021.

* cited by examiner

DEBRIS CLEANING MECHANISM AND CLEANING DEVICE

TECHNICAL FIELD

The present disclosure relates to the technical field of vacuum cleaners and, in particular, relates to a debris cleanup mechanism and a cleaning device.

BACKGROUND

A user is required to manually open a debris bucket cover of an existing vacuum cleaner to clean up debris therein, which makes user operations cumbersome.

Meanwhile, before the vacuum cleaner is cleaned, it is required for the user to disassemble the vacuum cleaner for effective cleaning; however, during a cleaning process, it is impossible to guarantee that an inner wall surface of the debris bucket and a filter in the debris bucket can be completely cleaned.

SUMMARY

According to one aspect of the present disclosure, the present disclosure provides a debris cleanup mechanism. The debris cleanup mechanism includes a drive mechanism, a transmission mechanism and a debris scraping mechanism, wherein the transmission mechanism includes a gear box, which is connected to the drive mechanism by an input shaft and is connected to the debris scraping mechanism by an output shaft; the debris scraping mechanism includes a debris scraping body, and the output shaft is in transmission connection with the debris scraping body to drive the debris scraping body to move; and the debris scraping body is provided with a first debris scraping strip and/or a second debris scraping strip.

In some implementations, the transmission mechanism further includes an axially disposed rack, wherein the rack is matched with a gear on the output shaft to transmit a driving force of the output shaft to the rack, and the rack is in transmission connection with the debris scraping body and drives the debris scraping body to move.

In some implementations, the debris cleanup mechanism further includes a sealing cover, wherein the sealing cover is configured to isolate dirty air from clean air; the gear box is disposed on a clean air side and the rack is disposed on a dirty air side; and the output shaft passes through the sealing cover to connect the rack and the gear box.

In some implementations, the first debris scraping strip abuts against an inner wall of a debris bucket of a cleaning device and is configured to scrape off debris on the inner wall, and the second debris scraping strip is configured to scrape off debris on an outer surface of a filter of the cleaning device.

In some implementations, an accommodating sleeve matched with the rack is formed on the sealing cover, and the rack moves in the accommodating sleeve along an axial direction of the debris bucket.

In some implementations, the output shaft is provided with a sealing block to perform sealing when the output shaft passes through the sealing cover.

In some implementations, the debris cleanup mechanism further includes a vibration block, wherein the vibration block is disposed on the dirty air side, is in transmission connection with the drive mechanism, and can implement a transverse or longitudinal vibration.

According to the other aspect of the present disclosure, the present disclosure provides a cleaning device. The cleaning device includes a debris bucket and a debris bucket cover, and further includes the debris cleanup mechanism set forth above and a cover opening mechanism, wherein the transmission mechanism cooperates with the cover opening mechanism, and, when the rack of the transmission mechanism moves to a preset position along the axial direction of the debris bucket, the cover opening mechanism is pushed to move so as to release a lock-up state of the debris bucket cover with respect to the debris bucket.

In some implementations, the cover opening mechanism includes a slider, a push rod and a turnbuckle, wherein the slider is disposed on the top of an axial chute formed in the sealing cover, with one end of the slider being located in the accommodating sleeve and the other end of the slider being located on an outer wall of the debris bucket and abutting against the top end of the push rod; the push rod is disposed on the outer wall of the debris bucket, and the bottom end of the push rod abuts against the turnbuckle, which is configured to lock up a hook connecting the debris bucket and the debris bucket cover; and, when the rack moves in the accommodating sleeve to a preset position along an axial direction of the debris bucket, a protrusion formed on the rack pushes one end of the slider, such that the slider moves to the bottom of the chute; meanwhile the other end of the slider pushes the push rod to move toward the turnbuckle, and the turnbuckle rotates under a force to open the hook and release the lock-up state of the cover opening mechanism.

In some implementations, the height of the rack is half of the axial height of the debris bucket.

REFERENCE NUMERALS

Figure 1:
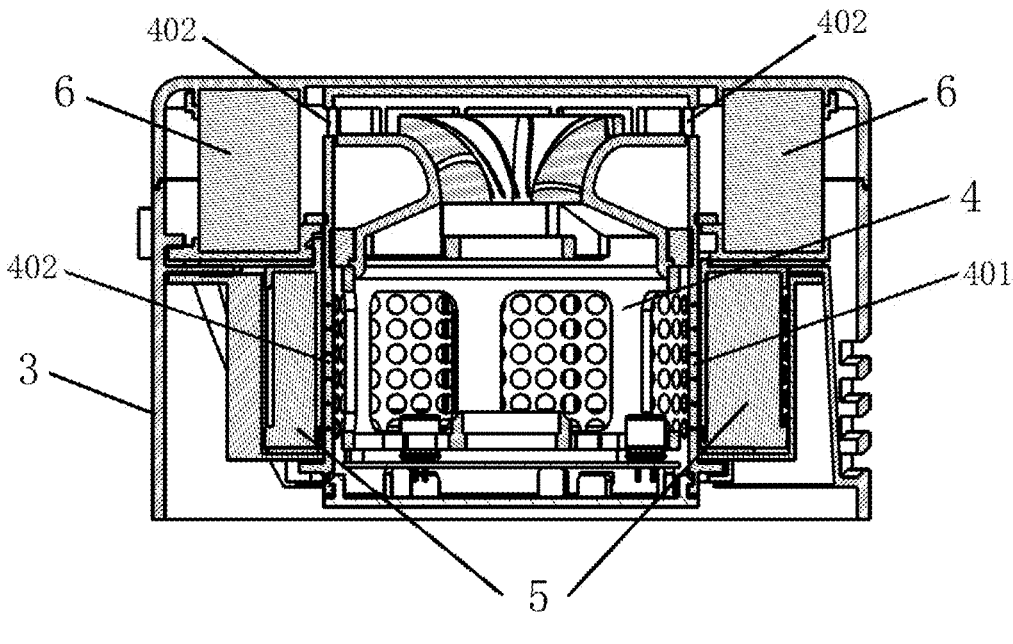
FIG. 1 is a structural diagram of a filter assembly according to a first embodiment of the present disclosure.

A: inner-circle cyclone tube group; a inner cyclone tube; B: outer-circle cyclone tube group; b: outer cyclone tube; c: interval; e: axial bevel gear; f: radial bevel gear;

1: cyclone tube cover; 101: flow guide tube: 102: accommodating sleeve; 103: groove;

2: sealing element; 201: sleeve;

3: shell: 4: fan assembly; 401: air inlet; 402: air outlet; 5: pre-filter; 6: post-filter; 51: circular top; 52: annular columnar body; 601: debris bucket; 602: debris bucket cover;

7: drive mechanism; 8: gear box; 801: output shaft; 802: gear; 9: debris scraping body; 901: first debris scraping strip; 902: second debris scraping strip; 10: stainless-steel filter; 11: slider; 12: push rod; 13: turnbuckle: 14: hook; 15: rack; 16: vibration block; 17: isolation hood; 1701: mounting groove: 18: debris collecting cylinder; 1801: annular connection part: 1802: hermetic connection part; 191: lifting module; 192: debris scraping module; 193: housing; 194: filter; 197: toggle switch; 198: toggle lever; 199: clamping mechanism; 19111: drive member; 19112: speed changing box; 19121: lift support; 19122: lift rod; 19123: lifting module fixing sheet; 19124: guide rod: and 19125: screw rod.

DETAILED DESCRIPTION

To make the objectives, technical solutions, and advantages of the present disclosure clearer, the present disclosure will be further described in detail below with reference to specific embodiments and the accompanying drawings. It should be understood that these descriptions are merely exemplary and are not intended to limit the scope of the present disclosure. In addition, the descriptions of well-known structures and techniques are omitted in the description below to avoid unnecessarily obscuring the concepts of the present disclosure.

The accompanying drawings show schematic diagrams of a layer structure according to an embodiment of the present disclosure. These drawings are not drawn to scale, and some details may be omitted. The shapes of various regions and layers shown in the drawings, as well as the relative size and positional relationship therebetween, are only exemplary and may vary in practice due to manufacturing tolerances or technical limitations. A person skilled in the art may additionally design regions/layers with different shapes, sizes, and relative positions according to actual needs.

Apparently, the described embodiments are only part of, rather than all of, the embodiments of the present disclosure. Based on the embodiments in the present disclosure, every other embodiment obtained by a person of ordinary skills in the art without creative labor shall fall within the protection scope of the present disclosure.

In addition, the technical features involved in different embodiments of the present disclosure described below may be combined with each other as long as they do not conflict with each other.

The present disclosure will be described in more detail below with reference to the accompanying drawings. In each drawing, the same elements are denoted by similar reference numerals. For the sake of clarity, all sections in the accompanying drawings are not drawn to scale.

In a first embodiment of the present disclosure, the present disclosure further provides a filter assembly that is disposed on the top of a debris bucket 601 of a vacuum cleaner and that is also located above a cyclone separation apparatus. The filter assembly includes a shell 3, a fan assembly 4, a pre-filter 5 and a post-filter 6. The fan assembly 4 is disposed in the shell 3, the pre-filter 5 is disposed at air inlets 401 of the fan assembly 4 to filter an airflow entering the fan assembly 4, and the air inlets 401 are disposed around the fan assembly 4; and the post-filter 6 is disposed at air outlets 402 of the fan assembly 4 to filter an airflow flowing out from the fan assembly 4, and the air outlets 402 are disposed in an axial direction of the fan assembly 4 and/or in a radial direction of the fan assembly 4.

FIG. 1 is a structural diagram of a filter assembly according to a first embodiment of the present disclosure.

Figure 2:
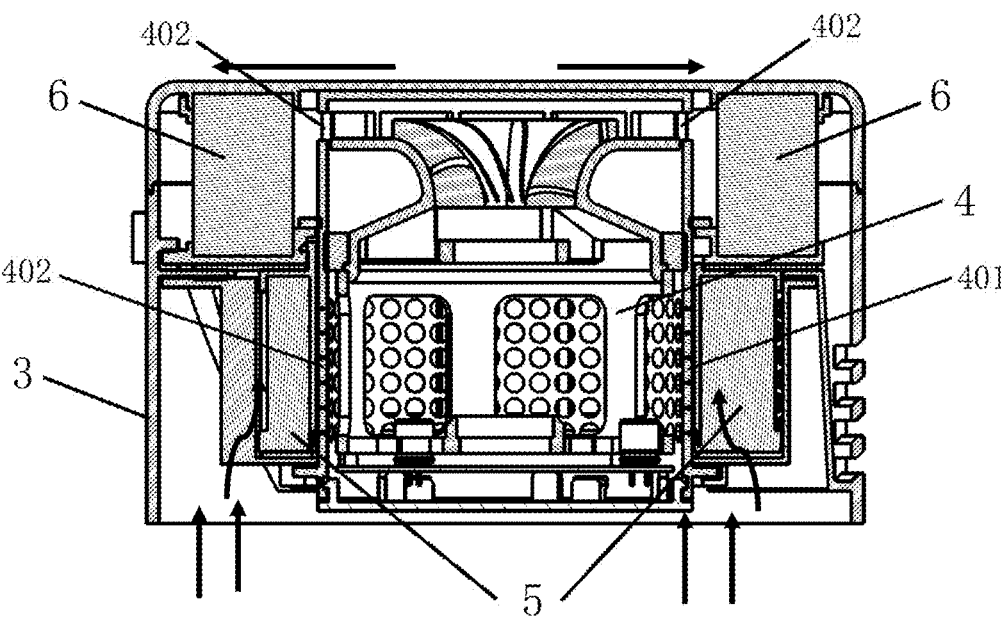
FIG. 2 is a diagram of an air path of the filter assembly according to the first embodiment of the present disclosure.

FIG. 2 is a diagram of an air path of the filter assembly according to the first embodiment of the present disclosure.

In some embodiments, referring to FIG. 1 and FIG. 2, the airflow flows in from the bottom of the fan assembly 4 and then flows out from the top of the fan assembly 4. The air inlets 401 are disposed in the bottom of the fan assembly 4, and the air outlets 402 are disposed in the top of the fan assembly 4. The fan assembly 4 further includes a fan and blades. The fan is disposed at the air inlets 401 and the blades are disposed at the air outlets 402. Therefore, the pre-filter 5 sleeves the outer periphery of the fan, and the post-filter 6 is arranged in the circumferential direction of the blades.

Meanwhile, the air inlets 401 are disposed close to the surface that the airflow flows through, such that the airflow entering the fan assembly 4 directly flows in without detouring in the device, which reduces the distance of an airflow path. After flowing through the fan assembly 4, the airflow directly flows out in a radial direction from the upper part of the fan assembly 4.

As shown in FIG. 2, the airflow flows to the outer periphery of the pre-filter 5, passes through the pre-filter 5 and enters the fan, then flows out of the fan to the blades, then flows to the post-filter 6, and finally flows out of the vacuum cleaner. In FIG. 2, the airflow flows out from an opening in a side face of the shell 3. In some embodiments, the airflow may also flow out from an opening in the top of the shell 3.

In some embodiments, the air inlets 401 are disposed in a side wall of the fan assembly 4 and around the fan of the fan assembly 4, while the air outlets 402 are disposed in the side wall of the fan assembly 4 and are disposed in an axial direction of the blades of the fan assembly 4. In this case, the pre-filter 5 is provided as an annular columnar body and sleeves the outer periphery of the air inlet 401; the post-filter 6 is also provided as an annular columnar body and is disposed in the circumferential direction of the blades of the fan assembly 4; and the airflow flows in from a lower side wall of the fan assembly 4 and flows out from an upper side wall of the fan assembly 4.

In some embodiments, the air inlets 401 are disposed in the side wall of the fan assembly 4 and around the fan of the fan assembly 4, and the air outlets 402 are disposed in the top of the blades of the fan assembly 4. In this case, the pre-filter 5 is provided as an annular columnar body and sleeves the outer periphery of the air inlets 401; the post-filter 6 is circular and is disposed at the top of the blades of the fan assembly 4; and the airflow flows in from the lower side wall of the fan assembly 4 and flows out from the top of the fan assembly 4.

Figure 3:
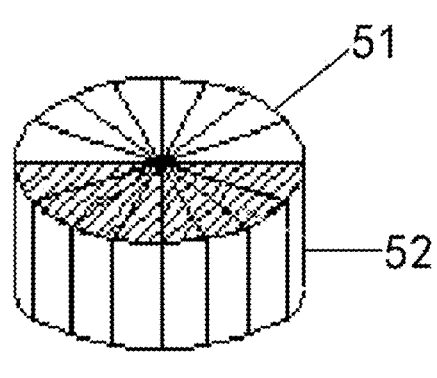
FIG. 3 is a structural diagram of a post-filter according to the first embodiment of the present disclosure.

FIG. 3 is a structural diagram of a post-filter according to the first embodiment of the present disclosure.

In some embodiments, the air inlets 401 are disposed in the side wall of the fan assembly 4 and around the fan of the fan assembly 4 and the air outlets 402 are disposed in the side wall and top of the fan assembly 4 at the blades. Referring to FIG. 3, in this case the post-filter 6 includes a circular top 51 and an annular columnar body 52: the circular top 51 is disposed on the air outlets 402 at the top of the fan assembly 4, and the annular columnar body 52 surrounds the air outlets 402 in the side wall of the fan assembly 4; and the airflow flows in from the lower side wall of the fan assembly 4 and flows out from the top and the top side wall of the fan assembly 4.

In some embodiments, the pre-filter 5 and the post-filter 6 are arranged side by side in the axial direction of the fan assembly, and the airflows in the pre-filter 5 and the post-filter 6 are isolated from each other in an axial direction by using an isolation ring that is disposed at a connection between the pre-filter 5 and the post-filter 6. In this case, the pre-filter 5 surrounds a lower half of the outer periphery of the fan assembly 4, and the post-filter 6 surrounds an upper half of the outer periphery of the fan assembly 4. The pre-filter 5 and the post-filter 6 are provided in an integrally connected nondetachable form, and may also be provided in a split-connected separately detachable form. When the filters need to be cleaned, the pre-filter 5 and the post-filter 6 are removed together from the top of the debris bucket 601 of the vacuum cleaner, or the post-filter 6 and the pre-filter 5 are removed in sequence.

In order to ensure that all the airflows flowing through the pre-filter 5 enter the fan assembly 4 and, meanwhile, ensure that all the airflows from the fan assembly 4 pass through the post-filter 6 and then flow out, it is necessary to provide an isolation ring at a connection between the pre-filter 5 and the post-filter 6, which can also ensure that the airflows flowing through the pre-filter 5 and the post-filter 6 are not mixed with each other.

In some embodiments, when the pre-filter 5 and the post-filter 6 are integrally connected, the pre-filter 5 and the post-filter 6 are jointly and detachably arranged in a frame.

In some embodiments, when the pre-filter 5 and the post-filter 6 are split-connected, the pre-filter 5 and the post-filter 6 are detachably arranged in a pre-filter frame and a post-filter frame, which are matched therewith. The pre-filter frame and the post-filter frame are detachably connected to form an integral frame. In this case, the pre-filter 5 only surrounds the air inlets 401 on the outer periphery of the fan assembly 4, and the post-filter 6 only surrounds the air outlets 402 on the outer periphery of the fan assembly 4. When the filters need to be cleaned, the post-filter 6 is first removed from the top of the debris bucket 601 of the vacuum cleaner, and then the pre-filter 5 is removed.

In some embodiments, the detachable arrangement or detachable connection includes one of elastic snap butt-joint, rotary snap connection, magnetic connection, concave-convex groove butt-joint, threaded connection, keyed connection, and pin connection.

In order to ensure that all the airflows flowing through the pre-filter 5 enter the fan assembly 4 and, meanwhile, ensure that all the airflows of the fan assembly 4 pass through the post-filter 6 and then flow out, it is necessary to provide an isolation ring at a connection between the pre-filter 5 and the air inlets 401, and also provide an isolation ring at a connection between the post-filter 6 and the air outlets 402.

In some embodiments, the diameter of the post-filter 6 is larger than the diameter of the pre-filter 5, such that a reserved space is included between the pre-filter 5 and a wall of the debris bucket 601, and this reserved space is configured to accommodate a plurality of vertical accommodating sleeves 102 that are formed in a cyclone tube cover 1 described below.

Figure 4:
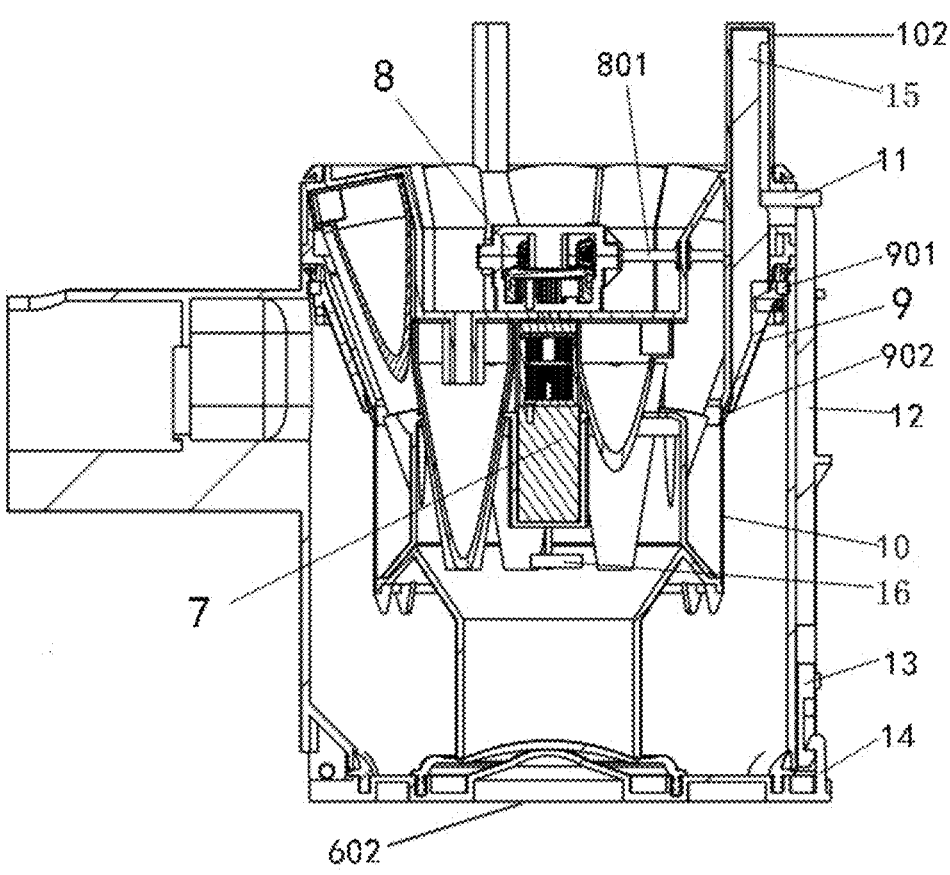
FIG. 4 is a structural diagram of a debris cleanup mechanism according to a second embodiment of the present disclosure.

FIG. 4 is a structural diagram of a debris cleanup mechanism according to a second embodiment of the present disclosure.

Figure 5:
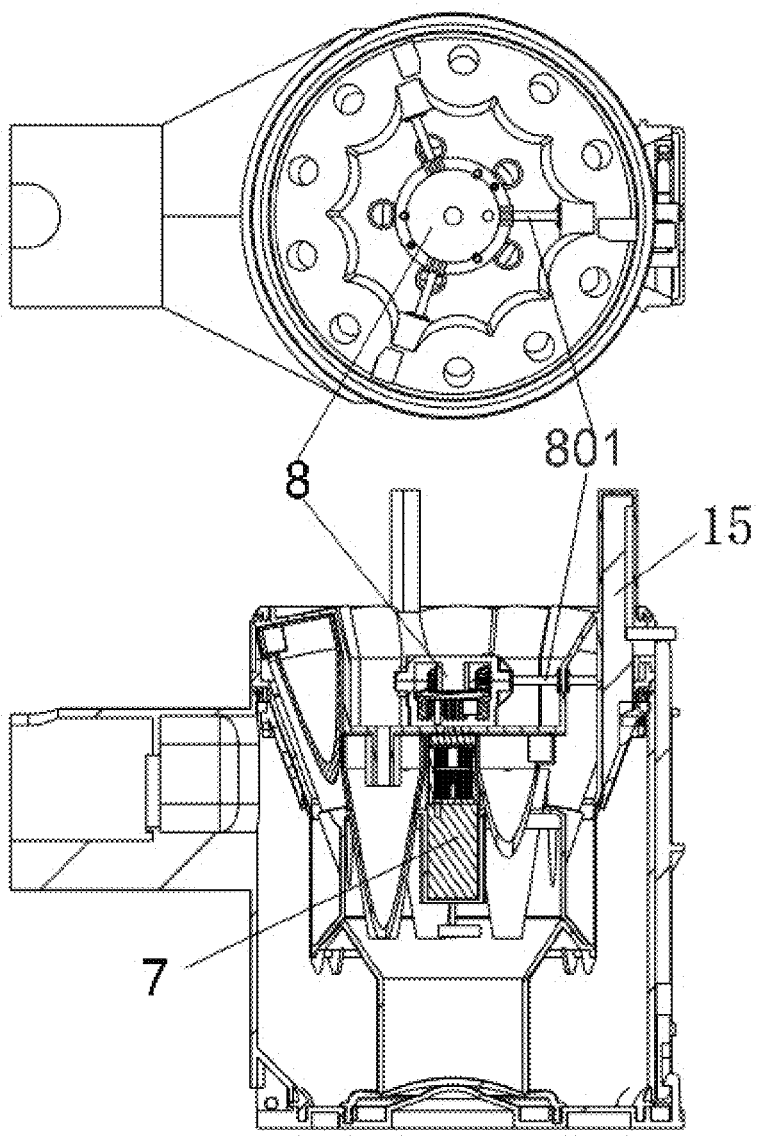
FIG. 5 is a schematic installation diagram of a gear box of the debris cleanup mechanism according to the second embodiment of the present disclosure.

FIG. 5 is a schematic installation diagram of a gear box of the debris cleanup mechanism according to the second embodiment of the present disclosure.

In a second embodiment of the present disclosure, referring to FIG. 4 and FIG. 5, the present disclosure further provides a debris cleanup mechanism. The debris cleanup mechanism is disposed in a cyclone separation apparatus described below, a part of the debris cleanup mechanism is disposed in a groove 103 in the middle of a cyclone tube cover 1, and the other part of the debris cleanup mechanism is disposed in a central through hole formed in the middle of an inner-circle cyclone tube group A.

In some embodiments, the debris cleanup mechanism includes a drive mechanism 7, a transmission mechanism and a debris scraping mechanism. The drive mechanism 7 is a motor that provides power for the debris cleanup mechanism. The transmission mechanism includes a gear box 8, which is connected to the drive mechanism 7 by means of an input shaft and to the debris scraping mechanism by means of an output shaft 801, and the gear box 8 is configured to drive the debris scraping mechanism to move in an axial direction of a debris bucket of a cleaning device so as to scrape off debris in the debris bucket. The debris scraping mechanism includes a debris scraping body 9; the gear box 8 is in transmission connection with the debris scraping body 9 by means of the output shaft 801 so as to drive the debris scraping body 9 to move in the axial direction of the debris bucket to scrape off the debris in the debris bucket. The debris scraping body 9 is further provided with at least one of a first debris scraping body strip 901 and a second debris scraping strip 902, which means a first debris scraping body strip 901 or a second debris scraping strip 902, or both a first debris scraping body strip 901 and a second debris scraping strip 902. The first debris scraping strip 901 is in contact with the inner wall of the debris bucket to scrape off debris on the inner wall of the debris bucket and the second debris scraping strip 902 is configured to scrape off residual debris on an outer surface of a filter of the cleaning device.

In some embodiments, the gear box 8 includes a plurality of output shafts 801.

In some embodiments, a stainless-steel filter 10 is installed on the outer periphery of the cyclone separation apparatus. When the debris scraping body 9 moves in the axial direction of the debris bucket, the debris adhering to the stainless-steel filter 10 is scraped off while the debris on an inner wall of the debris bucket is scraped off.

In some embodiments, the outer periphery of the first debris scraping strip 901 is provided with a circle of plush strip or other alternative materials to which debris can stick for scraping off the debris adhered to the inner wall of the debris bucket. The inner periphery of the second debris scraping strip 902 is provided with a rubber strip or other alternative material to which the debris can stick for scraping off the debris adhering to the wall of the filter.

In some embodiments, the debris scraping body 9 is provided as a conical or cylindrical structure. When the debris scraping body 9 is conical, the diameter of the first debris scraping strip 901 is larger than the diameter of the second debris scraping strip 902, such that the debris remaining on the inner wall of the debris bucket can be scraped off and, meanwhile, the debris remaining on other devices in the debris bucket can be scraped off. When the debris scraping body 9 is of a cylindrical structure, the top of the cylindrical structure is provided with a circle of structure extending outward, namely the first debris scraping strip 901, and the second debris scraping strip 902 is located at the bottom of the cylindrical structure. In this case, the diameter of the first debris scraping strip 901 is also larger than that of the second debris scraping strip 902.

In some embodiments, the transmission mechanism further includes a plurality of axially disposed racks 15. The racks 15 cooperate with the gears 802 disposed on respective output shafts 801 to transmit a driving force of the output shaft 801 to the racks 15. The racks 15 are in transmission connection with the debris scraping body 9, the output shafts 801 transmit the driving force to the gears 802, the gears 802 drive the racks 15, and the racks 15 drive the debris scraping body 9 to move in the axial direction of the debris bucket.

In some embodiments, the gear box 8 has a plurality of output shafts 801 extending horizontally outward, and each output shaft 801 is provided with the gear 802.

The debris cleanup mechanism further includes a sealing cover (corresponding to a cyclone separation apparatus hereinafter) that is configured to isolate dirty air from clean air. The gear box 8 is disposed on a clean air side and the rack 15 is disposed on a dirty air side. The output shaft 801 passes through the sealing cover to connect the rack 15 and the gear box 8.

In some embodiments, a sealing cover of the debris cleanup mechanism in the present disclosure is the cyclone separation apparatus. Here, the drive mechanism 7 is disposed in a through hole formed in the middle of the inner-circle cyclone tube group A, and the gear box 8 is disposed in a groove 103 provided in the middle of the cyclone tube cover 1. A plurality of vertical accommodating sleeves 102 matched with the racks 15 is formed in the cyclone tube cover 1, and the gears 802 drive the racks 15 to move in the accommodating sleeves 102 in the axial direction of the debris bucket 601.

In some embodiments, the accommodating sleeves 102 are integrally formed with the cyclone tube cover 1; 10-second cyclone tubes b are divided into three cyclone tube groups, with each cyclone tube group disposed at intervals in the circumferential direction; and the three accommodating sleeves 102 are disposed within the intervals among the individual cyclone tube groups, respectively.

Figure 6:
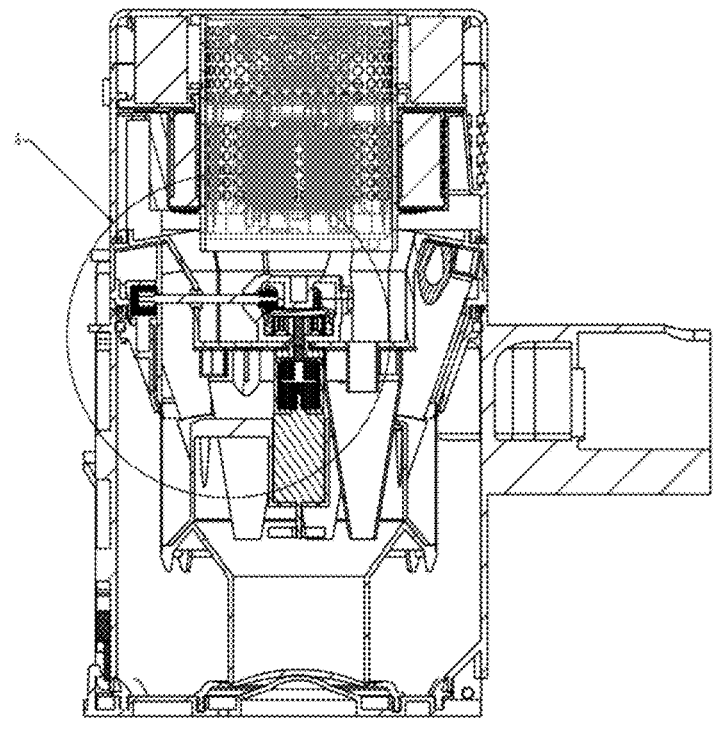
FIG. 6 is a schematic installation diagram of a gear and a rack of the debris cleanup mechanism according to the second embodiment of the present disclosure.

FIG. 6 is a schematic installation diagram of a gear and a rack of the debris cleanup mechanism according to the second embodiment of the present disclosure.

Figure 7:
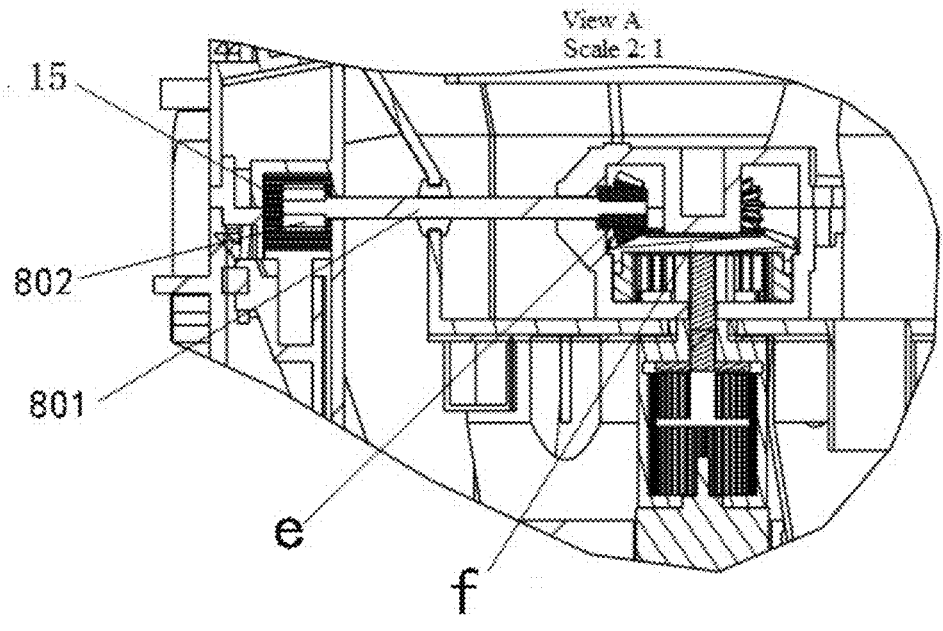
FIG. 7 is a partially enlarged view based on FIG. 6.

FIG. 7 is a partially enlarged view based on FIG. 6.

In some embodiments, referring to FIG. 6 and FIG. 7, the sealing cover is configured to isolate dirty air from clean air. The gear box 8 is disposed on a clean air side and the rack 15 is disposed on a dirty air side. The output shaft 801 passes through the sealing cover to connect the rack 15 and the gear box 8.

In some embodiments, the drive mechanism 7 and the gear box 8 are disposed in the cyclone separation apparatus described below, and the racks 15 of the transmission mechanism are disposed outside the cyclone separation apparatus. An input shaft of the gear box 8 includes an axial bevel gear e and a radial bevel gear f, which are connected in cooperation. One end of each of the output shafts 801 of the gear box 8 is connected to the input shaft by means of the axial bevel gear e, and the other end of the output shaft 801 passes through an outer-circle cyclone tube group B, such that the gear 802 on the output shaft 801 is matched with the respective rack 15.

In some embodiments, each of the output shafts 801 is provided with a sealing block to seal a through hole in a tube wall when the output shaft 801 passes through the outer-circle cyclone tube group B.

In some embodiments, a vibration block 16 is further included. The vibration block 16 is disposed in a through hole formed in the middle of the inner-circle cyclone tube group A, namely on the dirty air side; is in transmission connection with the drive mechanism 7; and can implement a transverse or longitudinal vibration to shake off adherent debris.

In some embodiments, a cover opening mechanism is further included for locking and connecting the debris bucket cover 602 and the debris bucket 601. The transmission mechanism cooperates with the cover opening mechanism, and, when the rack 15 of the transmission mechanism moves to a preset position along an axial direction of the debris bucket 601, the cover opening mechanism is pushed to move so as to release a lock-up state of the debris bucket cover 602 with respect to the debris bucket 601.

Figure 8:
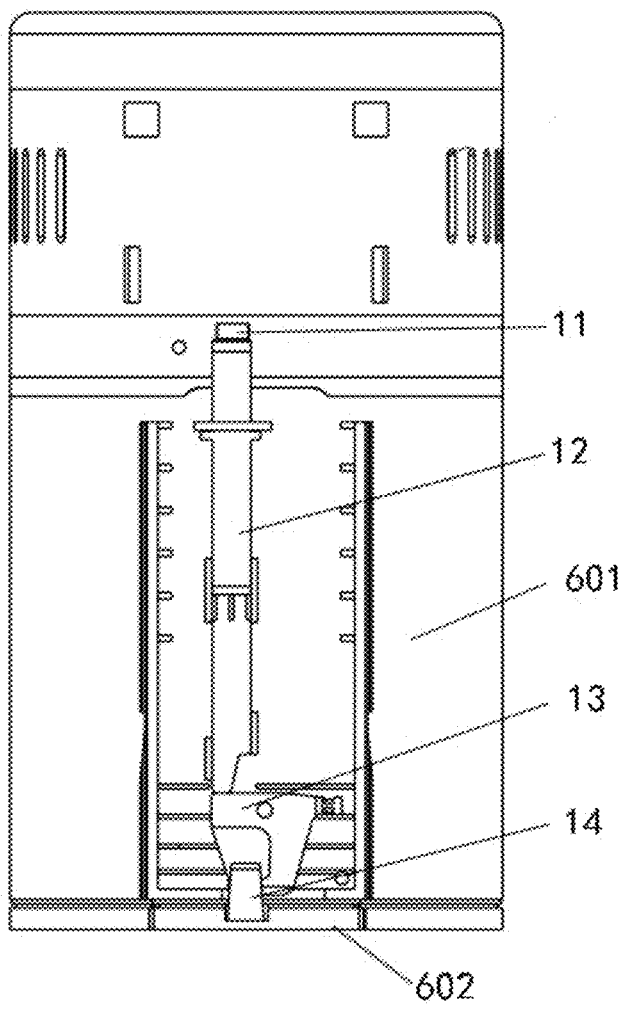
FIG. 8 is a schematic structural diagram of a cover opening mechanism of the debris cleanup mechanism according to the second embodiment of the present disclosure.

FIG. 8 is a schematic structural diagram of a cover opening mechanism of the debris cleanup mechanism according to the second embodiment of the present disclosure.

In some embodiments, referring to FIG. 8, the cover opening mechanism includes a slider 11, a push rod 12, and a turnbuckle 13. The slider 11 is disposed at the top of an axial chute formed in the sealing cover, with one end of the slider 11 being located in the accommodating sleeve 102 and the other end of the slider 11 being located on the outer wall of the debris bucket 601 and abutting with a top end of the push rod 12. The push rod 12 is radially disposed on the outer wall of the debris bucket 601 and has a bottom end abutted with the turnbuckle 13. The turnbuckle 13 is configured to lock up a hook 14 that connects the debris bucket cover 602 and the debris bucket 601.

When the rack 15 moves in the accommodating sleeve 102 to a preset position in the axial direction of the debris bucket 601, a protrusion provided on the rack 15 pushes one end of the slider 11, such that the slider 11 moves to the bottom of the chute, the other end of the slider 11 simultaneously pushes the push rod 12 to move toward the turnbuckle 13, and the turnbuckle 13 rotates under a force so as to open the hook 14 and release the lock-up state of the cover opening mechanism.

In the debris cleanup mechanism of the present disclosure, when the rack 15 moves in the accommodating sleeve 102 in the axial direction of the debris bucket 601, the debris scraping body 9 is pushed to scrape off the debris remaining on the inner wall of the debris bucket 601 and, meanwhile, scrape off the debris remaining on other devices within the debris bucket 601. When the rack 15 moves to the preset position, a debris scraping action is ended and the cover opening mechanism simultaneously starts to work to open a debris bucket cover 602, such that the debris falls automatously.

In some embodiments, the height of the rack 15 is half the axial height of the debris bucket 601.

In some embodiments, in order to ensure that the debris scraping body 9 can completely scrape an inner wall of the vacuum cleaner, it is necessary to move the debris scraping body 9 to the bottom of the debris bucket 601 as much as possible. Therefore, the height of the rack 15 is set to be equal to half of the axial height of the debris bucket 601.

In some embodiments, the height of the rack 15 is equal to the height of the stainless-steel filter 10.

In some embodiments, the stroke of the entire debris cleanup mechanism is equal to the height of the rack 15. This height needs to be determined according to the construction of the entire vacuum cleaner. Also, this height may be configured to the overall height of the stainless-steel filter 10 in the vacuum cleaner so as to facilitate the second debris scraping strip 902 to completely scrape the stainless-steel filter 10.

In some embodiments, the height of the rack 15 is equal to the vertical height of the pre-filter 5.

In some embodiments, as mentioned above, a reserved space is included between the pre-filter 5 and the inner wall of the debris bucket 601 for accommodating the accommodating sleeve 102, in which the rack 15 is provided. According to the construction of the entire vacuum cleaner, the height of the rack 15 is set to be equal to the vertical height of the pre-filter 5.

Figure 9:
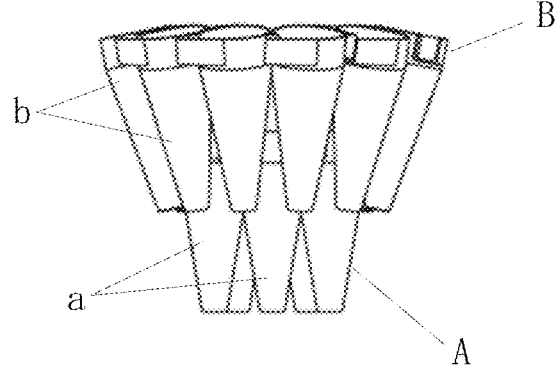
FIG. 9 is a schematic structural diagram of a cyclone separation apparatus according to a third embodiment of the present disclosure.

FIG. 9 is a schematic structural diagram of a cyclone separation apparatus according to a third embodiment of the present disclosure.

Figure 10:
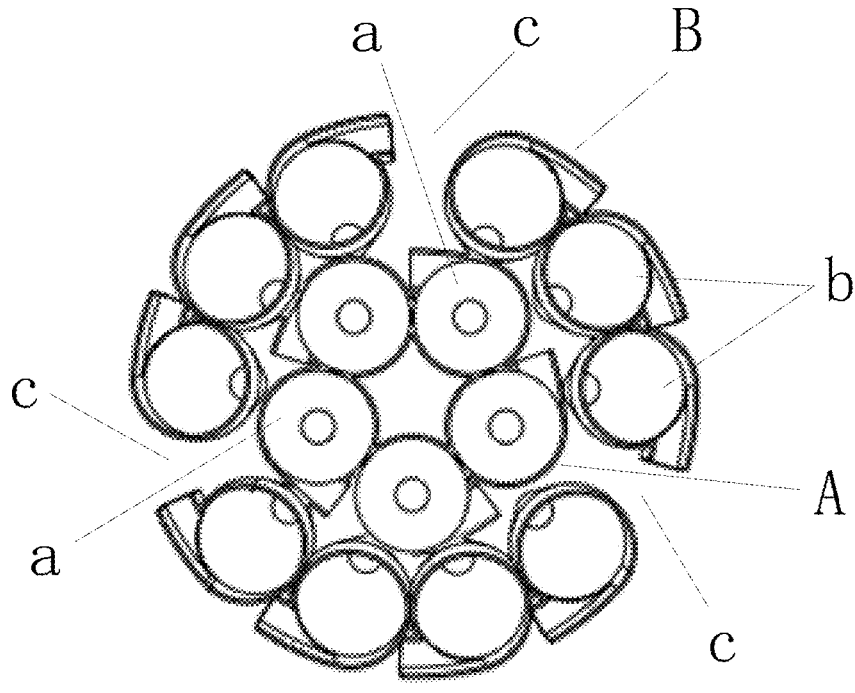
FIG. 10 is a top view of FIG. 9.

FIG. 10 is a top view of FIG. 9.

In the third embodiment of the present disclosure, as shown in FIG. 9 and FIG. 10, a cyclone separation apparatus is provided, which mainly includes an inner-circle cyclone tube group A and an outer-circle cyclone tube group B. An air outlet end of the inner-circle cyclone tube group A is recessed in an air outlet end of the outer-circle cyclone tube group B to form a recessed space.

In some embodiments, the outer-circle cyclone tube group B is ring-shaped and is disposed around the inner-circle cyclone tube group A, while the air outlet end of the outer-circle cyclone tube group B is disposed on the same side as the air outlet end of the inner-circle cyclone tube group A; a debris discharge end of the outer-circle cyclone tube group B is disposed on the same side as a debris discharge end of the inner-circle cyclone tube group A; and the air outlet end of the inner-circle cyclone tube group A is recessed in the outer-circle cyclone tube group B to form a recessed space that is, in some embodiments, configured to accommodate the gear box 8 of the debris cleanup mechanism. In some embodiments, the inner-circle cyclone tube group A includes a plurality of inner cyclone tubes a. The axes of the plurality of inner cyclone tubes a are disposed in parallel without overlap. In a cross section perpendicular to the axes of the plurality of inner cyclone tubes a, the center points of the plurality of inner cyclone tubes a are located in the same circumferential direction.

In some embodiments, the cyclone separation apparatus defines a longitudinal axis, the inner-circle cyclone tube group A includes a plurality of inner cyclone tubes a, and the axes of the plurality of inner cyclone tubes a are parallel to and do not overlap with a longitudinal axis defined by the cyclone separation apparatus. The outer-circle cyclone tube group B includes a plurality of outer cyclone tubes b, and the axes of the plurality of outer cyclone tubes b form an angle with the longitudinal axis defined by the cyclone separation apparatus. In a cross section perpendicular to the longitudinal axis defined by the cyclone separation apparatus, the plurality of inner cyclone tubes a and the plurality of outer cyclone tubes b are respectively arranged in a ring shape.

In some embodiments, the inner-circle cyclone tube group A includes a plurality of inner cyclone tubes a and the outer-circle cyclone tube group B includes a plurality of outer cyclone tubes b. The inner cyclone tube a and the outer cyclone tube b are cyclone tubes having the same structure. The dimensions of the inner cyclone tube a and the outer cyclone tube b are not limited. The cyclone tube is a conical pipe and has open upper and lower ends: the upper end is the air outlet end (a cyclone end), the lower end is the debris discharge end, and the opening at the upper end is larger than the opening at the lower end. The cyclone separation apparatus defines the longitudinal axis—the axes of the inner cyclone tubes a are disposed longitudinally and the axes of the plurality of inner cyclone tubes a are parallel to and do not overlap with the longitudinal axis defined by the cyclone separation apparatus. The air outlet ends and debris discharge ends of all the inner cyclone tubes a have the same height in the longitudinal direction, the air outlet ends and debris discharge ends of all the outer cyclone tubes b have the same height in the longitudinal direction; and, in the cross section perpendicular to the longitudinal axis defined by the cyclone separation apparatus the plurality of inner cyclone tubes a and the plurality of outer cyclones tubes b are respectively arranged in a ring shape. The plurality of inner cyclone tubes a are disposed to surround the plurality of outer cyclone tubes.

In some embodiments, the plurality of outer cyclone tubes b form a plurality of outer cyclone tube groups that are disposed at intervals in the circumferential direction to form interval.

The outer-circle cyclone tube group B may be divided into three cyclone tube groups, with each cyclone tube group including an approximately equal number of the outer cyclone tubes b. For example, when the outer-circle cyclone tube group B includes seven outer cyclone tubes b, the number of outer cyclone tubes b included in each of the three cyclone tube groups is two, two and three, respectively; when the outer-circle cyclone tube group B includes eight outer cyclone tubes b, the number of outer cyclone tubes b included in each of the three cyclone tube groups is two, three and three, respectively; when the outer-circle cyclone tube group B includes nine outer cyclone tubes b, the number of outer cyclone tubes b included in each of the three cyclone tube groups is three, three and three, respectively;

when the outer-circle cyclone tube group B includes 10 outer cyclone tubes b, the number of outer cyclone tubes b included in each of the three cyclone tube groups is three, three and four, respectively; and so forth. Adjacent cyclone tube groups are disposed at intervals in the circumferential direction to form interval, which is configured to allow the accommodating sleeve 102 to be placed.

In some embodiments, each of the outer cyclone tube groups includes a plurality of outer cyclone tubes b that are distributed around the inner-circle cyclone tube group A.

In some embodiments, the center of the inner-circle cyclone tube group A is provided with a run-through gap along the direction of the longitudinal axis defined by the cyclone separation apparatus, and the run-through gap is configured to accommodate a part of the debris cleanup mechanism.

In some embodiments, the center of the inner-circle cyclone tube group A is provided with a central through hole along the direction of the longitudinal axis defined by the cyclone separation apparatus, and the axial direction of the central through hole is disposed to overlap the longitudinal axis defined by the cyclone separation apparatus.

In some embodiments, the axes of some of the outer cyclone tubes b intersect at an angle with the longitudinal axis defined by the cyclone separation apparatus.

In some embodiments, the axes of some of the outer cyclone tubes b respectively form angles with the longitudinal axis defined by the cyclone separation apparatus in different planes. In some embodiments, the angle between the outer cyclone tube b and the longitudinal axis defined by the cyclone separation apparatus is in the range of 6° to 25°. For example, the angle may be one of 8°, 10°, 12°, 14°, 16°, 18°, 20°, 22° and 24°. The angle between each outer cyclone tube b and the longitudinal axis defined by the cyclone separation apparatus may be the same. Under the limits of certain conditions such as space conditions and the size and shape of the cyclone tube, the angles between the plurality of outer cyclone tubes b and the longitudinal axis defined by the cyclone separation apparatus may be different.

In some embodiments, the axes of the plurality of outer cyclone tubes b intersect at the same point on the longitudinal axis defined by the cyclone separation apparatus.

A specific implementation is as follows: the outer-circle cyclone tube group B includes 10 outer cyclone tubes b that are distributed around the axis of the cylindrical inner-circle cyclone tube group A, and the axis of each of the outer cyclone tubes b forms an angle with the axis of the inner-circle cyclone tube group A. The 10 outer cyclone tubes b are divided into three cyclone tube groups, wherein two of the cyclone tube groups each include three outer cyclone tubes b, and the last cyclone tube group includes four outer cyclone tubes b, with a circumferential gap between every two cyclone tube groups. The axis of each of the outer cyclone tubes b forms an angle of 7° with the axis of the inner-circle cyclone tube group A, and the axes of all outer cyclone tubes b intersect at a point on the axis of a first cyclone assembly.

In some embodiments, different from the previous embodiments, the axes of the plurality of outer cyclone tubes b are parallel to the axis of the inner-circle cyclone tube group A.

Figure 11:
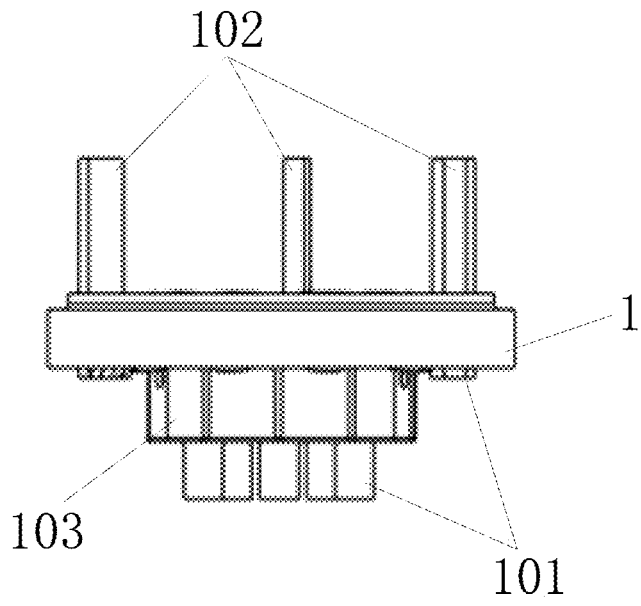
FIG. 11 is a schematic structural diagram of a cyclone tube cover according to the third embodiment of the present disclosure.

FIG. 11 is a schematic structural diagram of a cyclone tube cover according to the third embodiment of the present disclosure.

In some embodiments, as shown in FIG. 11, the cyclone separation apparatus further includes a cyclone tube cover 1. The cyclone tube cover 1 covers the air outlet ends of the inner and outer cyclone tubes a and b and is provided with flow guide tubes 101 extending into the individual inner and outer cyclone tubes a and b. Air inlets of the inner and outer cyclone tubes a and b are formed in the side walls of the inner and outer cyclone tubes a and b. Here, in the axial direction of the inner and outer cyclone tubes a and b, air inlet ends of the flow guide tubes 101 are disposed between the air inlets of the inner and outer cyclone tubes a and b and the corresponding debris discharge ends of the inner and outer cyclone tubes a and b.

In some embodiments, the cyclone tube cover 1 is disposed above the inner-circle cyclone tube group A and the outer-circle cyclone tube group B, i.e., at the air outlet sides of the inner-circle cyclone tube group A and the outer-circle cyclone tube group B. A groove 103 corresponding to the recessed space is formed in the middle of the cyclone tube cover 1 and is configured to allow the gear box 8 of the debris cleanup mechanism to be placed. The bottom of the groove 103 is provided with a through hole, the axis of which coincides with the axis of the central through hole, and the size of which matches the central through hole. The through hole is configured for the installation of the drive mechanism 7 of the debris cleanup mechanism. The cyclone tube cover 1 is provided with the flow guide tubes 101 corresponding to the inner and outer cyclone tubes a and b; the air inlet ends (lower ends) and air exhaust ends (upper ends) of the flow guide tubes 101 are open. A side wall at the open upper end of each of the inner and outer cyclone tubes a and b is provided with the air inlet, at which an air inlet passage is disposed. The openings of the air inlet passages all face outward. The air inlets of the air inlet passages are respectively disposed around the outer edges of the corresponding inner-circle and outer-circle cyclone tube groups A and B, such that an airflow swirls into each of the cyclone tubes under the guidance of the respective air inlet passage. The lower end of each of the flow guide tubes 101 extends into the corresponding inner and outer cyclone tubes a and b, and is lower than the air inlets of the inner and outer cyclone tubes a and b in the longitudinal height. That is, in the axial direction of the inner and outer cyclone tubes a and b, the air inlet end of each of the flow guide tubes 101 is disposed between the air inlets of the inner and outer cyclone tubes a and b and the corresponding debris discharge ends of the inner and outer cyclone tubes a and b. The flow guide tube 101 is configured to assist in forming a cyclone while guiding the airflow, thereby improving a cyclone separation effect and facilitating the separation of particulate garbage.

In some embodiments, the opening directions of the air inlet passages of the inner and outer cyclone tubes a and b are disposed in opposite directions.

In some embodiments, the opening directions of the air inlet passages of the plurality of inner cyclone tubes a cause the airflow in the clockwise direction to enter tangentially, and the opening directions of the air inlet passages of the plurality of outer cyclone tubes b cause the airflow in the counterclockwise direction to enter tangentially. Alternatively, the opening directions of the air inlet passages of the plurality of inner cyclone tubes a cause the airflow in the counterclockwise direction to enter tangentially, and the opening directions of the air inlet passages of the plurality of outer cyclone tubes b cause the airflow in the clockwise direction to enter tangentially.

In some embodiments, the outer edge of the cyclone tube cover 1 is provided with an accommodating sleeve 102. The accommodating sleeve 102 extends in the same direction as an air outlet direction of the inner-circle cyclone tube group A, and an open end of the accommodating sleeve 102 is disposed at an interval.

A specific implementation is as follows: three accommodating sleeves 102 extending upward are vertically arranged at the outer edge of the cyclone tube cover 1; the openings of the accommodating sleeves 102 face downward; and the three accommodating sleeves 102 are each disposed in the aforementioned interval between every two cyclone tube groups.

Figure 12:
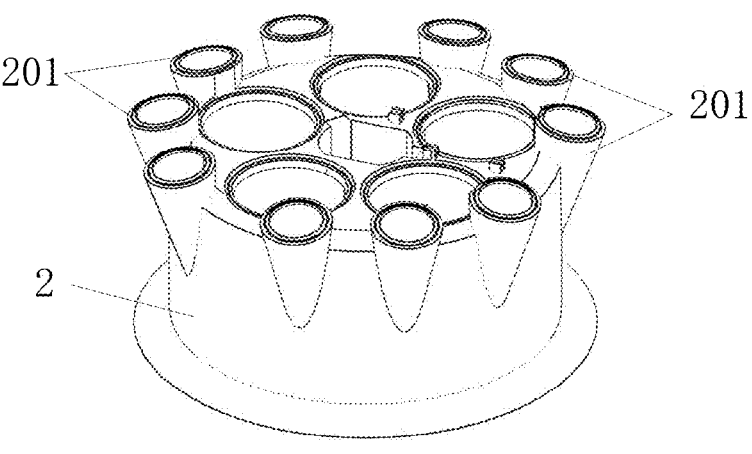
FIG. 12 is a schematic structural diagram of a sealing element according to the third embodiment of the present disclosure.

FIG. 12 is a schematic structural diagram of a sealing element according to the third embodiment of the present disclosure.

In some embodiments, as shown in FIG. 12, the cyclone separation apparatus further includes a sealing element 2. The sealing element 2 sleeves the debris discharge ends of the outer-circle and inner-circle cyclone tube groups B and A and is configured to seal the airflow, which enters a second cyclone assembly, against flowing to the debris discharge ends of the outer-circle and inner-circle cyclone tube groups B and A.

In some embodiments, the sealing element 2 is columnar and is located at the conical debris discharge ends of the inner and outer cyclone tubes a and b. The sealing element 2 is provided with sleeves 201 corresponding to the inner and outer cyclone tubes a and b, and the sleeves 201 hermetically sleeve and are connected to the inner and outer cyclone tubes a and b. The middle of the sealing element 2 is axially provided with an accommodating groove that is matched with the central through hole and configured to accommodate the drive mechanism 7 of the debris cleanup mechanism.

In some embodiments, the axial direction of the sleeve 201 is coaxial with the axial direction of the corresponding cyclone tube.

Figure 13:
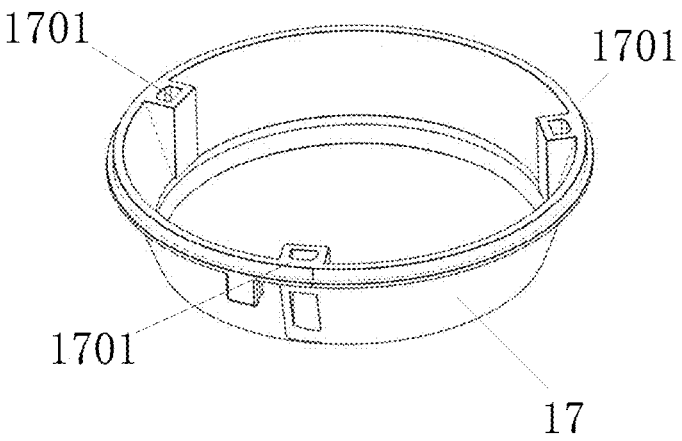
FIG. 13 is a schematic structural diagram of an isolation hood according to the third embodiment of the present disclosure.

FIG. 13 is a schematic structural diagram of an isolation hood according to the third embodiment of the present disclosure.

In some embodiments, as shown in FIG. 13, the cyclone separation apparatus further includes an isolation hood 17. The isolation hood 17 is provided with a mounting groove 1701 for use with the accommodating sleeves 102, and is hermetically connected to the cyclone tube cover 1.

In some embodiments, the isolation hood 17 is funnel-shaped. The upper and lower ends of the isolation hood 17 are open, and the opening at the lower end is smaller than the opening at the upper end. In some embodiments, the isolation hood 17 is disposed around the outer-circle cyclone tube group B. The top of the isolation hood 17 is hermetically connected to the bottom of the cyclone tube cover 1. The top edge of the isolation hood 17 is provided with three mounting grooves 1701 for use with the accommodating sleeves 102. The positions of the accommodating sleeves 102 correspond to the positions of the mounting grooves 1701. The racks 15 in the foregoing embodiments are disposed in the mounting grooves 1701. Under the cooperation of the accommodating sleeves 102 with the mounting grooves 1701, the gears 802 drive the racks 15 to move in the accommodating sleeves 102 in the axial direction of the debris bucket 601.

Figure 14:
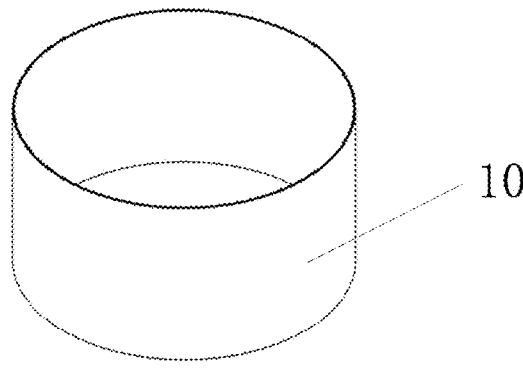
FIG. 14 is a schematic structural diagram of a stainless-steel filter according to the third embodiment of the present disclosure.

FIG. 14 is a schematic structural diagram of a stainless-steel filter according to the third embodiment of the present disclosure.

In some embodiments, as shown in FIG. 14, the cyclone separation apparatus further includes a stainless-steel filter 10, which is disposed around the isolation hood 17.

In some embodiments, the stainless-steel filter 10 is matched with the isolation hood 17, and is disposed at the bottom of the isolation hood 17, and the top of the stainless-steel filter 10 is connected to the bottom of the isolation hood 17.

Figure 15:
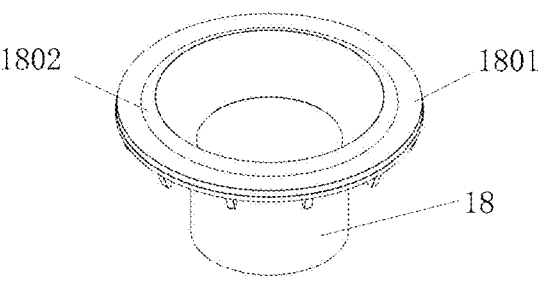
FIG. 15 is a schematic structural diagram of a debris collection cylinder according to the third embodiment of the present disclosure.

FIG. 15 is a schematic structural diagram of a debris collection cylinder according to the third embodiment of the present disclosure.

In some embodiments, as shown in FIG. 15, the cyclone separation apparatus includes a debris collecting cylinder 18. One end (the top end) of the debris collecting cylinder 18 is connected to the stainless-steel filter 10 and the bottom of the isolation hood 17, and the other end (the lower end) of the debris collecting cylinder 18 is hermetically connected to the bottom of the debris bucket 601.

In some embodiments, the upper end of the debris collecting cylinder 18 is provided with an annular connection part 1801 that extends radially outward and is provided with a hermetic connection part 1802 near a circle center. The hermetic connection part 1802 is configured to be hermetically connected to the bottom of the isolation hood 17 to prevent the airflow passing through the stainless-steel filter 10 from flowing to the bottom of the debris bucket 601, such that the airflow flows to the air inlets of all the cyclone tubes. The lower end of the debris collecting cylinder 18 is hermetically connected to the bottom of the debris bucket 601.

Figure 16:
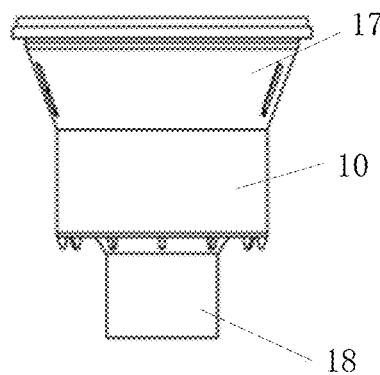
FIG. 16 is a schematic structural diagram of a hood of the cyclone separation apparatus according to the third embodiment of the present disclosure.

FIG. 16 is a schematic structural diagram of a hood of the cyclone separation apparatus according to the third embodiment of the present disclosure.

As shown in FIG. 16, the isolation hood 17, the stainless-steel filter 10 and the debris collecting cylinder 18 are arranged from top to bottom to constitute a hood of the cyclone separation apparatus. First cyclone separation is performed outside the hood of the cyclone separation apparatus, and the airflow subjected to the first cyclone separation can only enter the cyclone separation apparatus via the stainless-steel filter 10 for second cyclone separation, such that the stainless-steel filter 10 becomes the only entrance to the cyclone separation apparatus.

According to another aspect of the present application, a cleaning device is further provided. The cleaning device includes the cyclone separation apparatus according to any one of the above-mentioned solutions.

In a fourth embodiment of the present disclosure, an air path assembly of a vacuum cleaner is provided. The air path assembly mainly includes a first cyclone assembly, a second cyclone assembly and a filter assembly, wherein the second cyclone assembly is provided with a recessed space.

In some embodiments, the vacuum cleaner is provided with an air inlet and an air exhaust; the air inlet of the vacuum cleaner is formed in the side wall of the debris bucket 601; and the air exhaust of the vacuum cleaner is formed in the side face or top of the shell 3. An air inlet end of the first cyclone assembly is communicated to the air inlet of the vacuum cleaner; an air outlet end of the first cyclone assembly is communicated to an air inlet end of the second cyclone assembly; an air outlet end of the second cyclone assembly is communicated to an air inlet end of the filter assembly; and an air outlet end of the filter assembly is communicated to the air exhaust of the vacuum cleaner. An airflow entering the vacuum cleaner flows through the first cyclone assembly, the second cyclone assembly and the filter assembly in sequence and then is exhausted from the vacuum cleaner; and the first separation of the airflow is implemented at the first cyclone assembly, the second separation of the airflow is implemented at the second cyclone assembly, and third separation of the airflow is implemented at the filter assembly. Here, the second cyclone assembly is mainly disposed in the debris bucket 601 of the vacuum cleaner. The second cyclone assembly is recessed at the air outlet side to form a recessed space. It should be noted that the second cyclone assembly is the cyclone separation apparatus in the foregoing embodiments.

In some embodiments, the second cyclone assembly includes an inner-circle cyclone tube group A and an outer-circle cyclone tube group B, each of which includes a plurality of cyclone tubes. The air outlet end of the inner-circle cyclone tube group A is recessed at the air outlet end of the outer-circle cyclone tube group B to form a recessed space that is configured to accommodate a part of the debris cleanup mechanism.

In some embodiments, the second cyclone assembly mainly includes a cyclone tube separation system composed of an inner-circle cyclone tube group A and an outer-circle cyclone tube group B, and the same cyclone separation principle as the first cyclone assembly is used to implement the separation of the airflow from particulate garbage. The inner-circle cyclone tube group A and the outer-circle cyclone tube group B include a plurality of cyclone tubes, the air outlet ends of which are disposed on the same side. The air outlet end of the inner-circle cyclone tube group A is recessed at the air outlet end of the outer-circle cyclone tube group B, such that the top end of the inner-circle cyclone tube group A and the top end of the outer-circle cyclone tube group B are located at different heights respectively to form a recessed space. The airflow may pass through the gaps among the cyclone tubes and then enter the interior of the cyclone tubes from the air inlets of the cyclone tubes.

In some embodiments, the outer-circle cyclone tube group B includes a plurality of cyclone tube groups that are arranged at intervals to form interval.

In some embodiments, the outer-circle cyclone tube group B is ring-shaped; a plurality of cyclone tube groups are disposed in the circumferential direction of the outer-circle cyclone tube group B: and adjacent cyclone tube groups are arranged at intervals therebetween to form interval. The plurality of cyclone tube groups may be disposed at equal intervals or at unequal intervals according to the specific spatial structural arrangement, which is not limited herein.

In some embodiments, the second cyclone assembly further includes a sealing element 2. The sealing element 2 sleeves the debris discharge ends of the inner-circle and outer-circle cyclone tube groups A and B, and is configured to seal the airflow that enters the second cyclone assembly against its flow to the debris discharge ends of the inner-circle and outer-circle cyclone tube groups A and B.

In some embodiments, the sealing element 2 forms a hermetic structure at the debris discharge ends of the inner-circle and outer-circle cyclone tube groups A and B, such that the airflow can circulate along a preset air path; that is, the airflow is cyclone-separated by means of the cyclone tubes and then discharged.

In some embodiments, the second cyclone assembly further includes a cyclone tube cover 1. The cyclone tube cover 1 covers the air outlet ends of all the cyclone tubes and is provided with flow guide tubes 101, each of which extends into the respective cyclone tube. The air inlets of the cyclone tubes are formed in the side walls of the respective cyclone tubes. Here, an air inlet end of each of the flow guide tubes 101 is closer to the debris discharge end of the respective cyclone tube in the axial direction of the flow guide tube 101 with respect to the air inlet of the cyclone tube.

In some embodiments, under the guidance of the flow guide tubes 101 of the cyclone tube cover 1, the airflows discharged from the cyclone tubes pass through the flow guide tubes 101 to reach the top of the cyclone tube cover 1.

In some embodiments, the first cyclone assembly includes a stainless-steel filter 10 and a debris bucket 601. The stainless-steel filter 10 at least partially surrounds the second cyclone assembly; the wall of the debris bucket 601 surrounds the stainless-steel filter 10: and an annular cyclone flow channel is formed between the wall of the debris bucket 601 and the stainless-steel filter 10.

In some embodiments, the debris bucket 601 is cylindrical and is provided with a debris bucket cover 602 at the bottom. Opening the debris bucket cover 602 may discharge the debris and garbage in the debris bucket 601 out of the debris bucket 601. The stainless-steel filter 10 is an annular filter and is disposed in the debris bucket 601 and around the second cyclone assembly. The stainless-steel filter 10 and the debris bucket 601 are coaxially disposed, such that the annular cyclone flow channel is formed between the stainless-steel filter 10 and the debris bucket 601. An airflow passes through the cyclone flow channel to separate large particles of garbage, which then fall into the bottom of the debris bucket 601, thereby achieving the first separation (coarse separation) of the airflow; the airflow passing through the stainless-steel filter 10 enters the second cyclone assembly for further separation to separate small particles of garbage, thereby achieving the second separation (fine separation).

In some embodiments, the second cyclone assembly further includes a fan assembly 4. The filter assembly includes a pre-filter 5 and a post-filter 6. The pre-filter 5 is configured to filter an airflow that flows from the second cyclone assembly to the fan assembly 4: and the post-filter 6 is configured to filter an airflow that is discharged out of the fan assembly 4.

In some embodiments, the air path assembly further includes an air exhaust. The air exhaust is formed in the outer periphery or top of the fan assembly 4 for discharging the airflow out of the vacuum cleaner.

In some embodiments, the fan assembly 4 is cylindrical and is disposed in the shell 3. The air inlet 401 of the fan assembly 4 is formed in the bottom of the side wall and may be formed in the upper side wall or top of the fan assembly 4. The fan assembly 4 includes a fan and blades. The fan is disposed at the air inlet 401 of the fan assembly 4 and the blades are disposed at an air outlet 402 of the fan assembly 4, such that an airflow enters from the bottom of the side wall of the fan assembly 4, flows in the axial direction (from bottom to top) of the fan assembly 4 to the top of the fan assembly 4, and is then discharged in the axial or radial direction of the fan assembly 4. The pre-filter 5 is disposed at the air inlet 401 of the fan assembly 4 to filter an airflow that flows from the second cyclone assembly to the fan assembly 4, and the post-filter 6 is disposed at the air outlet 402 of the fan assembly 4 to filter an airflow that is discharged from the fan assembly 4, and the airflow filtered by the post-filter 6 is then discharged out of the vacuum cleaner.

In some embodiments, the pre-filter 5 and the post-filter 6 are annular columnar filters. The pre-filter 5 sleeves the outer periphery of the air inlet 401 and the post-filter 6 is disposed in the circumferential direction of the blades of the fan assembly 4, such that the airflow flows in the radial directions of the pre-filter 5 and the post-filter 6, thereby improving the efficiency of two-stage filtration.

In some embodiments, the pre-filter 5 and the post-filter 6 are annular columnar filters and sleeve the fan assembly 4. The mounting grooves of the pre-filter 5 and the post-filter 6 may be formed in the shell 3, such that the pre-filter 5 sleeves the outer periphery of the fan assembly 4, and the post-filter 6 is arranged in the circumferential direction of the blades, enabling the airflow to flow in the radial directions of the pre-filter 5 and the post-filter 6.

In some embodiments, the outer edge of the cyclone tube cover 1 is provided with an accommodating sleeve 102. The accommodating sleeve 102 extends in the same direction as an air outlet direction of the inner-circle cyclone tube group A. and an open end of the accommodating sleeve 102 is disposed at an interval.

Figure 17:
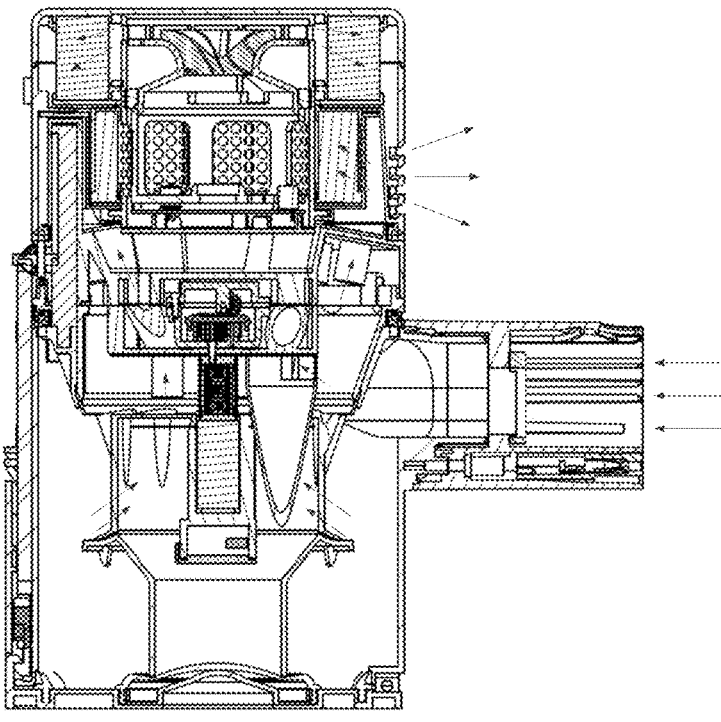
FIG. 17 is a schematic diagram of an airflow path according to the fourth embodiment of the present disclosure.

FIG. 17 is a schematic diagram of an airflow path according to the fourth embodiment of the present disclosure.

Under the action of a suction force produced by the fan, an airflow enters from an air inlet formed in the debris bucket 601 and passes through the cyclone flow channel formed in a space between the wall of the debris bucket 601 and the stainless-steel filter 10 for coarse separation. The airflow subjected to the coarse separation passes through the stainless-steel filter 10 and then through gaps among the cyclone tubes, and enters the corresponding cyclone tubes under the guidance of air inlet channels of the cyclone tubes to form cyclones in the cyclone tubes for implementing the second separation. The airflow enters the debris bucket 601 upon discharging small particles of garbage from the debris discharge ends by the cyclone tubes, and the airflow subjected to the second separation flows out from cyclone ends of the cyclone tubes under the guidance of the flow guide tubes 101 of the cyclone separator cover. The airflow passes the pre-filter, enters from the bottom of the side wall of the fan assembly 4, flows in the axial direction (from bottom to top) of the fan assembly 4 to the top of the fan assembly 4, and is then discharged in the axial or radial direction of the fan assembly 4; and then the air flow is filtered via the post-filter and discharged out of the vacuum cleaner from the air exhaust of the shell 3.

The following will introduce another debris scraping mechanism according to the fifth embodiment of the present disclosure.

Figure 18:
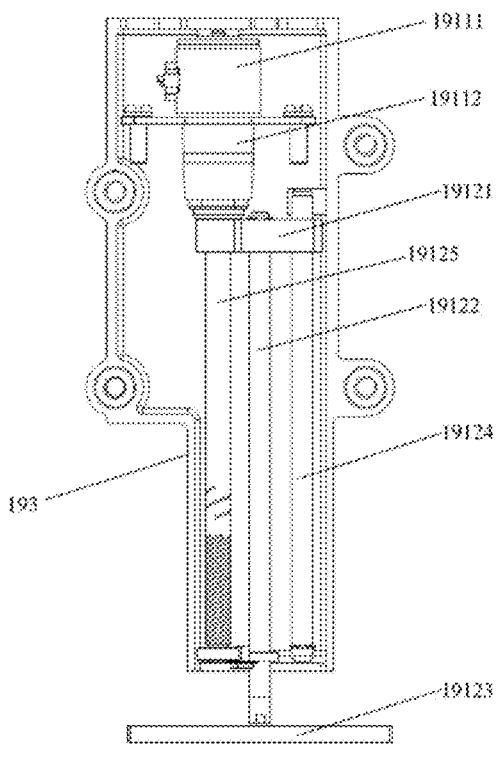
FIG. 18 is a schematic structural diagram of a debris scraping mechanism according to a fifth embodiment of the present disclosure.
Figure 19:
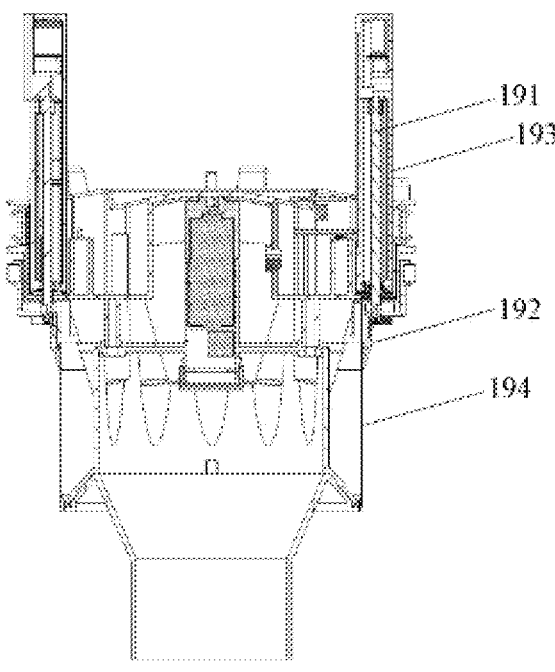
FIG. 19 is a schematic structural diagram of a cleaning device installed with the debris scraping mechanism according to the fifth embodiment of the present disclosure.

FIG. 18 is a schematic structural diagram of the debris scraping mechanism according to the fifth embodiment of the present disclosure, and FIG. 19 is a schematic structural diagram of a cleaning device installed with the debris scraping mechanism according to the fifth embodiment of the present disclosure. Referring to FIG. 18 and FIG. 19, the debris scraping mechanism according to this embodiment of the present disclosure includes a lifting module 191 and a debris scraping module 192. The tail end of the lifting module 191 is abutted with the debris scraping module 192, such that the lifting module 191 drives the debris scraping module to move while moving so as to scrape off debris or stains.

The lifting module 191 includes a drive assembly and a lifting assembly. The drive assembly and the lifting assembly are connected by means of gear transmission, such that the drive assembly can drive the lifting assembly to move.

In some embodiments, the drive assembly includes a drive member 19111 and a speed changing box 19112. The drive member 19111 is connected to the speed changing box 19112, which is connected to the lifting assembly; and the drive member 19111 provides a driving force to the speed changing box 19112, such that the speed changing box 19112 drives the lifting assembly to perform lifting at a preset speed. In some embodiments, the lifting assembly performs lifting by rotation.

The lifting assembly includes a lift support 19121, a screw rod 19125, a lift rod 19122 and a lifting module fixing sheet 19123. One end of the screw rod 19125 is connected to the output end of the speed changing box 19112, and the other end of the screw rod 19125 passes through a threaded hole in the lift support 19121. The rotational movement of the screw rod 19125 drives the lift support 19121 to move in an axis direction of the screw rod 19125.

One end of the lift rod 19122 is fixedly connected to the lift support 19121 and is parallel to the screw rod 19125, and the other end of the lift rod 19122 is connected to the lifting module fixing sheet 19123. The movement of the lift support 19121 drives the lift rod 19122 to move, and the lift rod 19122 drives the lifting module fixing sheet 19123 to move. Meanwhile, one face of the lifting module fixing sheet 19123 is fixedly connected to the other end of the lift rod 19122, and the other face of the lifting module fixing sheet 19123 is abutted with the debris scraping module 192, such that the lifting module fixing sheet 19123 finally pushes the debris scraping module 192 to move.

In some embodiments, the debris scraping module 192 moves by attaching to the filter 194 so as to scrape off the dirt or debris on the filter 194.

The lifting assembly further includes a guide rod 19124, which passes through a guide through hole in the lift support 19121 to guide the movement of the lifting assembly. In some embodiments, the guide rod 19124 is parallel to the screw rod 19125, the end of the lift support 19121 close to the guide rod 19124 is provided with the guide through hole, and the guide rod 19124 passes through the guide through hole, such that when the lift support 19121 moves, the guide through hole in the lift support 19121 can move on the guide rod 19124 in the axial direction of the guide rod 19124. In this case, the guide rod 19124 is stationary, such that the lift support 19121 does not deviate when moving, thereby ensuring that the screw rod 19125 does not deviate when moving.

In some embodiments, the guide through hole is abutted against the wall of the guide rod 19124, such that the lift support 19121 is prevented from deviation while the guide through hole moves in the axial direction of the guide rod 19124 without friction.

The debris scraping mechanism according to the fifth embodiment of the present disclosure includes a housing 193, in which the drive assembly is disposed. A part of the lifting assembly is disposed in the housing 193, and the other part of the lifting assembly may extend out of the housing 193 when the life assembly moves so as to butt with the debris scraping module 192.

First, the guide rod 19124 is fixed in the housing 193, one end of the guide rod 19124 is fixed at the bottom of the housing 193, and the other end of the guide rod 19124 is fixed on an inner wall of the housing 193.

In some embodiments, the drive member 19111 and the speed changing box 19112 are both disposed at the upper part of the housing 193. The screw rod 19125 is vertically disposed in the housing 193 and is located below the drive member 19111 and the speed changing box 19112. One end of the screw rod 19125 is connected to the speed changing box 19112, and the other end of the screw rod 19125 is close to the bottom of the housing 193.

The lift support 19121 is horizontally disposed in the housing 193 and is perpendicular to the screw rod 19125.

One end of the lift support 19121 close to the screw rod 19125 is provided with a threaded hole that is matched with a thread on the screw rod 19125, such that the screw rod 19125 is in toothed transmission connection with the lift support 19121. When rotating, the screw rod 19125 drives the lift support 19121 to move in the axial direction of the screw rod 19125.

The lift rod 19122 is disposed below the lift support 19121 and vertically connected to the lift support 19121, and is parallel to the screw rod 19125. The top end of the screw rod 19125 is fixedly connected to the lift support 19121, such that the lift rod 19122 moves in the axial direction of the screw rod 19125 under the drive of the lift support 19121. The tail end of the lift rod 19122 may extend out of the bottom of the housing 193 and is fixedly connected to one face of the lifting module fixing sheet 19123.

The other face of the lifting module fixing sheet 19123 is butted with the debris scraping module 192, the lift support 19121 drives the lift rod 19122 to move, and the lift rod 19122 drives the lifting module fixing sheet 19123 to move, thereby pushing the debris scraping module 192 to move to complete a debris scraping operation.

The debris scraping mechanism according to the fifth embodiment of the present disclosure includes a vibration module.

The vibration module is in transmission connection with the drive member 19111, and may vibrate transversely or vertically to shake off the debris or stains when the debris scraping module 192 scrapes off the debris.

Figure 20:
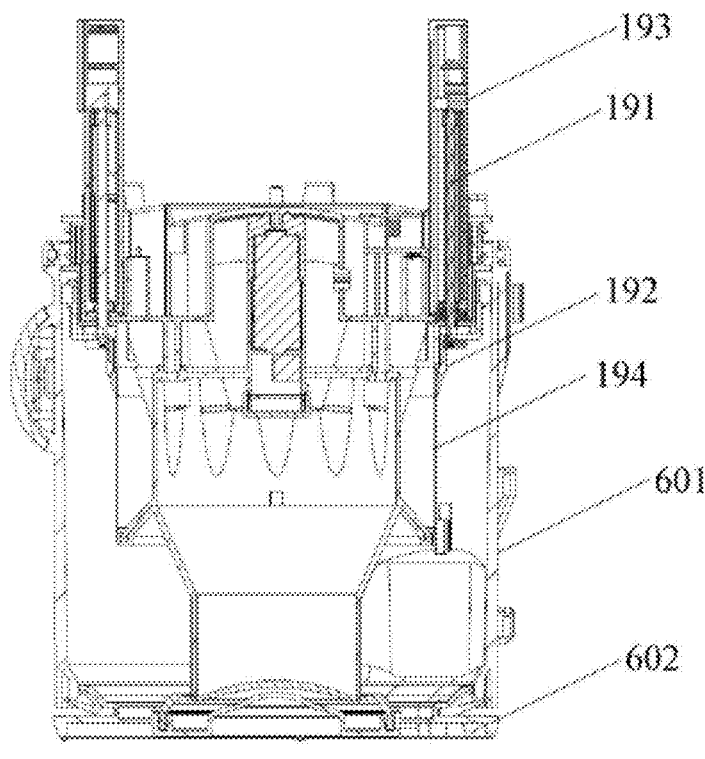
FIG. 20 is another schematic structural diagram of the cleaning device installed with the debris scraping mechanism according to the fifth embodiment of the present disclosure.
Figure 21:
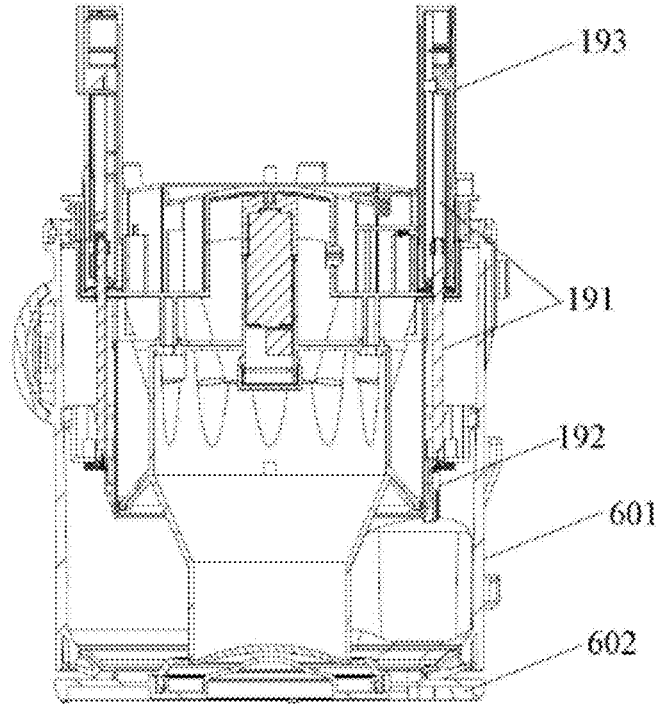
FIG. 21 is a schematic structural diagram of the debris scraping mechanism according to the fifth embodiment that performs a debris scraping operation according to another embodiment of the cleaning device in the present disclosure.
Figure 22:
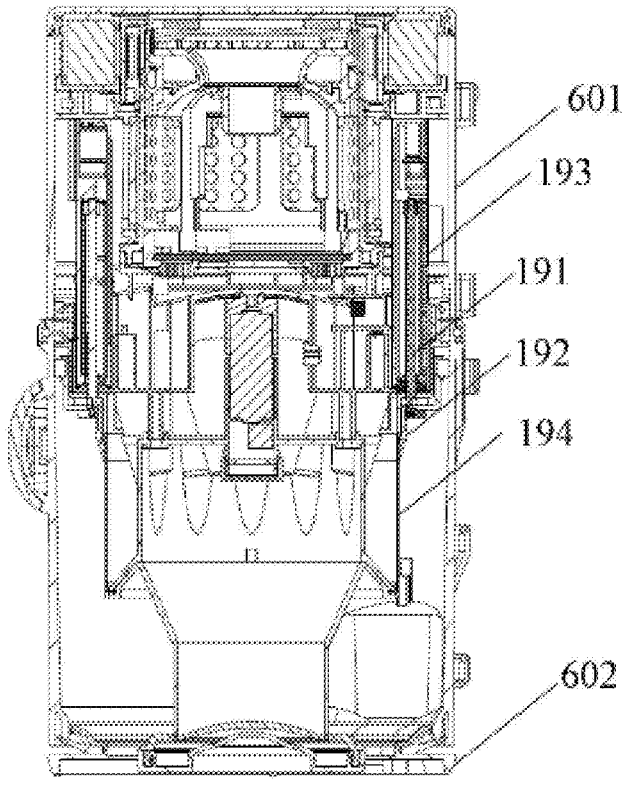
FIG. 22 is a complete schematic structural diagram of the debris scraping mechanism of the fifth embodiment according to another embodiment of the cleaning device in the present disclosure.

FIG. 20 is a schematic structural diagram of another embodiment of the cleaning device installed with the debris scraping mechanism according to the fifth embodiment of the present disclosure, FIG. 21 is a schematic structural diagram of the debris scraping mechanism according to the fifth embodiment that performs a debris scraping operation according to another embodiment of the cleaning device in the present disclosure, and FIG. 22 is a complete schematic structural diagram of the debris scraping mechanism of the fifth embodiment in another embodiment of the cleaning device in the present disclosure. Referring to FIG. 20 to FIG. 22, the fifth embodiment of the present disclosure further provides a cleaning device that includes a debris bucket 601 and a debris bucket cover 602, and further includes a debris scraping mechanism and a cover opening mechanism.

Here, the debris scraping mechanism is disposed in the debris bucket 601, and is configured to scrap off debris on a filter 194 installed in the debris bucket 601; and the debris bucket cover 602 is disposed at the bottom of the debris bucket 601, and is configured to seal the debris bucket 601. The cover opening mechanism is configured to close or open the debris bucket cover 602.

The debris scraping module 192 according to the fifth embodiment of the present disclosure may cooperate with the cover opening mechanism. When scraping off the debris and moving to a preset position in the axial direction of the debris bucket 601, the debris scraping module 192 pushes the cover opening mechanism to move, thereby releasing the lock-up state of the debris bucket cover 602 with respect to the debris bucket 601 so as to open the debris bucket 602, such that the debris in the debris bucket 601 automatically fall off after being scraped.

Figure 23:
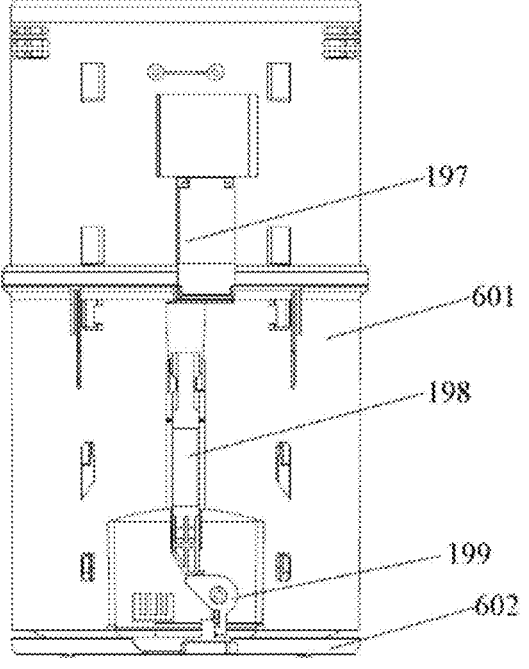
FIG. 23 is a schematic structural diagram of a cover opening mechanism according to the fifth embodiment of the present disclosure.

FIG. 23 is a schematic structural diagram of a cover opening mechanism according to the fifth embodiment of the present disclosure.

In some embodiments, the cover opening mechanism includes a toggle switch 197, a toggle lever 198 and a clamping mechanism 199. One end of the toggle switch 197 is disposed within the debris bucket 601 and is connected to the drive member 19111 of the drive assembly; and the other end of the toggle switch 197 extends out of the debris bucket 601, and can be pressed to drive the drive member 19111 to start working. When moving to the preset position in the axial direction of the debris bucket 601, the lifting module fixing sheet 19123 abuts with one end of the toggle lever 198, such that the other end of the toggle lever 198 may be pushed to move to a clamping mechanism 199. The clamping mechanism 199 is configured to connect the debris bucket cover 602 and the debris bucket 601. In this case, the clamping mechanism 199 starts to rotate under a pushing force of the toggle lever 198, thereby releasing the lock-up state of the debris bucket cover 602 with respect to the debris bucket 601.

In some embodiments, the clamping mechanism 199 includes a rotating shaft and a spring disposed in the rotating shaft. One end of the rotating shaft is disposed on the debris bucket 601, and the other end of the rotating shaft is formed as a snap that is cooperatively clamped and connected to a clamping slot in the debris bucket cover 602. The rotating shaft is rotated under a force to drive the snap to move away from the clamping slot, and the spring is compressed while the clamping is released.

When the rotating shaft is released from the force, the spring returns to an initial state, thereby driving the rotating shaft to reset.

In some embodiments, when the toggle switch 197 is lightly touched (shortly pressed), the drive member 19111 starts to work, that is, the debris scraping mechanism starts to perform a debris scraping operation. When the lifting assembly of the debris scraping mechanism moves down to a certain position, the lifting module fixing sheet 19123 triggers the toggle lever 198 to move down, such that the clamping mechanism 199 is released from the clamping state. Therefore, the working process of the cover opening mechanism is as follows: Opening is performed by relying on the drive assembly of the debris scraping mechanism, and when the debris scraping is completed, the cover opening mechanism is automatically opened to release the debris.

If the debris scraping mechanism fails, the lock-up state of the cover opening mechanism cannot be released by means of lightly touching (shortly pressing) the toggle switch 197 in the above embodiment. Therefore, the present disclosure further provides the following embodiments.

In some embodiments, when the toggle switch 197 is deeply touched (long pressed), the toggle switch 197 itself may trigger the toggle lever 198, such that the toggle lever 198 moves to the clamping mechanism 199, and the clamping mechanism 199 rotates under a force to release the lock-up state of the debris bucket cover 602 with respect to the debris bucket 601.

In some embodiments, one end of the toggle switch 197 is disposed in the debris bucket 601, and the other end of the toggle switch 197 extends out of the debris bucket 601; one end of the toggle switch 197 is clamped with one end of the toggle lever, and pressing the other end of the toggle switch 197 may release the clamping state between one end of the toggle lever 198 and one end of the toggle switch 197, such that the other end of the toggle lever 198 slides to the clamping mechanism 199 in the axial direction of the debris bucket 601: and the clamping mechanism 199 rotates under a force to release the lock-up state of the debris bucket cover 602 with respect to the debris bucket 601.

The debris scraping mechanism according to the fifth embodiment of the present disclosure includes a lifting module 191 and a debris scraping module 192. The lifting module 191 includes a drive assembly and a lifting assembly. The drive assembly can drive the lifting assembly to move, and the debris scraping module 192 is connected to the lifting assembly that can drive the debris scraping module 192 to move. The cleaning device includes a debris bucket 601 and a debris bucket cover 602, as well as a debris cleanup mechanism and a cover opening mechanism. The debris scraping module 192 cooperates with the cover opening mechanism, and when the debris scraping module 192 moves to a preset position along an axial direction of the debris bucket 601, the cover opening mechanism is pushed to move so as to release a lock-up state of the debris bucket cover 602 with respect to the debris bucket 601. The debris scraping mechanism automatically opens the debris bucket cover 602 at the bottom of the debris bucket 601 upon effectively removing the debris on the filter in the debris bucket, such that the debris is released under its own gravity, thereby reducing user operations and improving the use experience.

According to another aspect of the present disclosure, a cleaning device is further provided. The cleaning device includes the air path assembly of a vacuum cleaner according to any one of the above solutions.

According to another aspect of the present disclosure, a cleaning device is further provided. The cleaning device includes one or more of the filter assembly, the debris cleanup mechanism, the cyclone separation apparatus, and the air duct assembly of the vacuum cleaner in the foregoing technical solutions.

The cleaning device in the present disclosure may be a drum vacuum cleaner, and may also be applicable to other types of vacuum cleaners, for example, handheld vacuum cleaners, horizontal vacuum cleaners, and sweeping robots. Moreover, the technical solutions of the present disclosure may also be applicable to other types of cleaning devices, for example, wet and dry machine or carpet cleaning machines, and general-purpose surface treatment equipment, such as polishing/waxing machines, pressure washers, floor marking machines and lawn mowers.

It should be understood that the above specific embodiments according to the present disclosure are merely used to illustrate or explain the principles of the present disclosure, but do not constitute limitations to the present disclosure. Therefore, any modification, equivalent replacement, improvement, and the like made without departing from the spirit and scope of the present disclosure should be encompassed by the protection scope of the present disclosure. In addition, the appended claims of the present disclosure are intended to cover all changes and modifications that fall within the scope and boundary of the appended claims, or equivalents of such scope and boundary.

What is claimed is:

1. A debris cleanup mechanism, comprising a drive mechanism, a transmission mechanism and a debris scraping mechanism, wherein
    the transmission mechanism comprises a gear box that is connected to the drive mechanism by an input shaft and that is connected to the debris scraping mechanism by an output shaft, the drive mechanism is a motor;
    the debris scraping mechanism comprises a debris scraping body, and the output shaft is drivingly connected to the debris scraping body to drive the debris scraping body to move along an axial direction of a debris bucket; and
    the debris scraping body is provided with at least one of a first debris scraping strip and a second debris scraping strip,
    wherein the debris cleanup mechanism further comprises a vibration block, the vibration block is disposed on the dirty air side, is drivingly connected to the drive mechanism, and is capable of implementing a transverse or longitudinal vibration.

2. The debris cleanup mechanism according to claim 1, wherein the transmission mechanism further comprises a rack disposed in a direction parallel to the axial direction of the debris bucket;
    the rack is matched with a gear on the output shaft to transmit a driving force of the output shaft to the rack; and
    the rack is drivingly connected to the debris scraping body, and drives the debris scraping body to move.

3. The debris cleanup mechanism according to claim 2, further comprising a sealing cover, wherein
    the sealing cover is configured to isolate dirty air from clean air, the gear box is disposed on a clean air side, and the rack is disposed on a dirty air side; and
    the output shaft passes through the sealing cover to connect the rack and the gear box.

4. The debris cleanup mechanism according to claim 1, wherein the debris scraping body is provided with the first debris scraping strip and the second debris scraping strip,
    the first debris scraping strip abuts against an inner wall of the debris bucket of a cleaning device, and is configured to scrape off debris on the inner wall; and
    the second debris scraping strip is configured to scrape off debris on an outer surface of a filter of the cleaning device.

5. The debris cleanup mechanism according to claim 3, wherein
    an accommodating sleeve matched with the rack is formed on the sealing cover, and the rack moves in the accommodating sleeve along a direction parallel to the axial direction of the debris bucket.

6. The debris cleanup mechanism according to claim 3, wherein
    the output shaft is provided with a sealing block to perform sealing when the output shaft passes through the sealing cover.

7. A cleaning device, comprising a debris bucket and a debris bucket cover, further comprising the debris cleanup mechanism of claim 1; and
    a cover opening mechanism, wherein
    the transmission mechanism cooperates with the cover opening mechanism, and when the rack of the transmission mechanism moves to a preset position along the axial direction of the debris bucket, the cover opening mechanism is pushed to move so as to release a lock-up state of the debris bucket cover with respect to the debris bucket.

8. The cleaning device according to claim 7, wherein the height of the rack is half of an axial height of the debris bucket.

\* \* \* \* \*